United States Patent
Punsalan et al.

(10) Patent No.: US 7,632,590 B2
(45) Date of Patent: Dec. 15, 2009

(54) SYSTEM AND A METHOD FOR MANUFACTURING AN ELECTROLYTE USING ELECTRODEPOSITION

(75) Inventors: David Punsalan, Eugene, OR (US); Peter Mardilovich, Corvallis, OR (US); Gregory S Herman, Albany, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1336 days.

(21) Appl. No.: 10/620,675

(22) Filed: Jul. 15, 2003

(65) Prior Publication Data

US 2005/0014050 A1   Jan. 20, 2005

(51) Int. Cl.
- H01M 8/10 (2006.01)
- H01M 6/18 (2006.01)
- C25D 1/00 (2006.01)
- C25D 15/00 (2006.01)
- C25D 11/00 (2006.01)

(52) U.S. Cl. .................. 429/33; 429/30; 429/306; 429/314; 205/67; 205/109; 205/317

(58) Field of Classification Search .......... 429/12, 429/30, 33, 306, 314; 205/109, 76, 67, 317; 206/109, 317
See application file for complete search history.

(56) References Cited

U.S. PATENT DOCUMENTS

| | | | |
|---|---|---|---|
| 4,186,064 A | | 1/1980 | Morrissey |
| 4,952,293 A | * | 8/1990 | Sypula et al. ............... 204/479 |
| 5,002,647 A | * | 3/1991 | Tanabe et al. .............. 204/484 |
| 5,281,327 A | * | 1/1994 | Honda et al. ................ 205/198 |
| 5,385,661 A | | 1/1995 | Andricacos et al. |
| 5,441,823 A | * | 8/1995 | Naimer et al. ................ 429/42 |
| 6,083,647 A | | 7/2000 | Noda et al. |
| 6,224,991 B1 | | 5/2001 | Yates et al. |
| 6,258,861 B1 | * | 7/2001 | Steck et al. .................. 521/27 |
| 6,552,843 B1 | | 4/2003 | Tench et al. |
| 6,558,838 B1 | | 5/2003 | Noda et al. |
| 6,589,682 B1 | * | 7/2003 | Fleckner et al. ............. 429/34 |
| 2001/0014409 A1 | * | 8/2001 | Cohen ........................ 428/606 |
| 2001/0014420 A1 | * | 8/2001 | Takeuchi et al. ............ 429/209 |
| 2002/0014412 A1 | * | 2/2002 | December .................. 204/484 |
| 2002/0071915 A1 | | 6/2002 | Schubert et al. |
| 2002/0172871 A1 | * | 11/2002 | Schucker ................... 429/304 |
| 2003/0134177 A1 | * | 7/2003 | Furuya ........................ 429/42 |
| 2006/0188774 A1 | * | 8/2006 | Niu et al. ..................... 429/44 |

FOREIGN PATENT DOCUMENTS

| | | |
|---|---|---|
| EP | 0745702 | 12/1996 |
| JP | 2002203576 A * | 7/2002 |
| WO | WO 01/94668 * | 12/2001 |

OTHER PUBLICATIONS

Machine translation of JP 2002-203576A, reiied upon in the rejection.*

* cited by examiner

Primary Examiner—Patrick Ryan
Assistant Examiner—Eugenia Wang

(57) ABSTRACT

A method for manufacturing an electrolyte includes coupling a substrate to a charged electrode and electrodepositing a polymeric electrolyte on the substrate.

18 Claims, 10 Drawing Sheets

SYSTEM AND A METHOD FOR MANUFACTURING AN ELECTROLYTE USING ELECTRODEPOSITION

BACKGROUND

During the past several years, the popularity and viability of fuel cells for producing both large and small amounts of electricity has increased significantly. Fuel cells conduct an electrochemical reaction between chemicals such as hydrogen and oxygen to produce electricity and heat. Unlike batteries which store useable energy, fuel cells generate useable energy and are more easily "recharged" simply by replenishing the consumed fuel. Moreover, fuel cells are much cleaner and quieter than devices that combust hydrocarbons.

Fuel cells provide a direct current (DC) voltage that may be used to power motors, lights, computers, or any number of electrical appliances. While there are several different types of fuel cells, each using a different chemistry, fuel cells typically have three component parts: an anode, a cathode, and an electrolyte. Fuel cells are usually classified, depending on the type of electrolyte used, into one of five groups: alkaline fuel cells (AFC), phosphoric-acid fuel cells (PAFC), solid oxide fuel cells (SOFC), molten carbonate fuel cells (MCFC), and proton exchange membrane fuel cells (PEMFC). One variant of the PEMFC technology includes direct methanol fuel cells (DMFC), in which liquid methanol is directly fed to the fuel cell as fuel.

PEMFCs typically function by supplying hydrogen to an anode. The hydrogen provides protons to an electrolyte and releases electrons that pass through an external circuit to reach a cathode located opposite the anode. The protons solvate with water molecules and diffuse through the membrane to the cathode where they react with oxygen that has picked up electrons thereby forming water. PEMFCs have a number of distinct advantages over other fuel cells. PEMFCs have a very high power density (40% to 60% efficiency) and a very low operating temperature (around 80 degrees Celsius). Moreover PEMFCs do not utilized dangerous chemicals that may spill or leak. These qualities make PEMFCs extremely safe and low in maintenance requirements.

Traditionally, the proton exchange membrane (PEM) of a PEMFC has been formed by applying a solid semipermeable membrane to an electrode layer with an adhesive layer between the two. The membrane-adhesion layer electrode stack would then be compressed in the presence of heat to bond the layers together. However, traditional methods of forming PEM fuel cells tend to have a low amount of mechanical stability and are susceptible to swelling of the electrolyte. This swelling of the electrolyte often leads to increased fuel crossover resulting in degraded fuel efficiency of the fuel cell.

SUMMARY

A method for manufacturing an electrolyte includes coupling a substrate to a charged electrode; and electrodepositing a polymeric electrolyte on the substrate.

BRIEF DESCRIPTION OF THE DRAWINGS

The accompanying drawings illustrate various embodiments of the present invention and are a part of the specification. The illustrated embodiments are merely examples of the present invention and do not limit the scope thereof.

Throughout the drawings, identical reference numbers designate similar, but not necessarily identical, elements.

DETAILED DESCRIPTION

An apparatus and a method for forming an electrolyte that reduces the likelihood of swelling in a fuel cell while increasing structural support is described herein. According to one exemplary implementation, described more fully below, a method for the electrodeposition of polymeric electrolyte on a porous substrate is presented. The present system and method for the electrodeposition of polymeric electrolyte on a porous substrate will be described, for ease of explanation only, in the context of a proton exchange membrane fuel cell (PEMFC) including direct methanol fuel cells (DMFC). However, the apparatus and method described herein may be used to form the electrolyte of any type of fuel cell.

The term "electrodeposition" is meant to be understood both here and in the appended claims to mean the precipitation of a material at an electrode as the result of a passage of an electric current through or an application of an electrical field on a solution or suspension of material. Similarly, the term "electrolyte" is meant to be understood broadly as referring to a substance, either solid or liquid, that will provide ionic conductivity when dissolved in water or when in contact with it. One solid electrolyte, used originally in fuel cells, is a polymer of perflourinated sulfonic acid.

In the following description, for purposes of explanation, numerous specific details are set forth in order to provide a thorough understanding of an electrolyte formation process and apparatus. It will be apparent, however, to one skilled in the art that the electrolyte formation process and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Exemplary Structure

Figure 1:
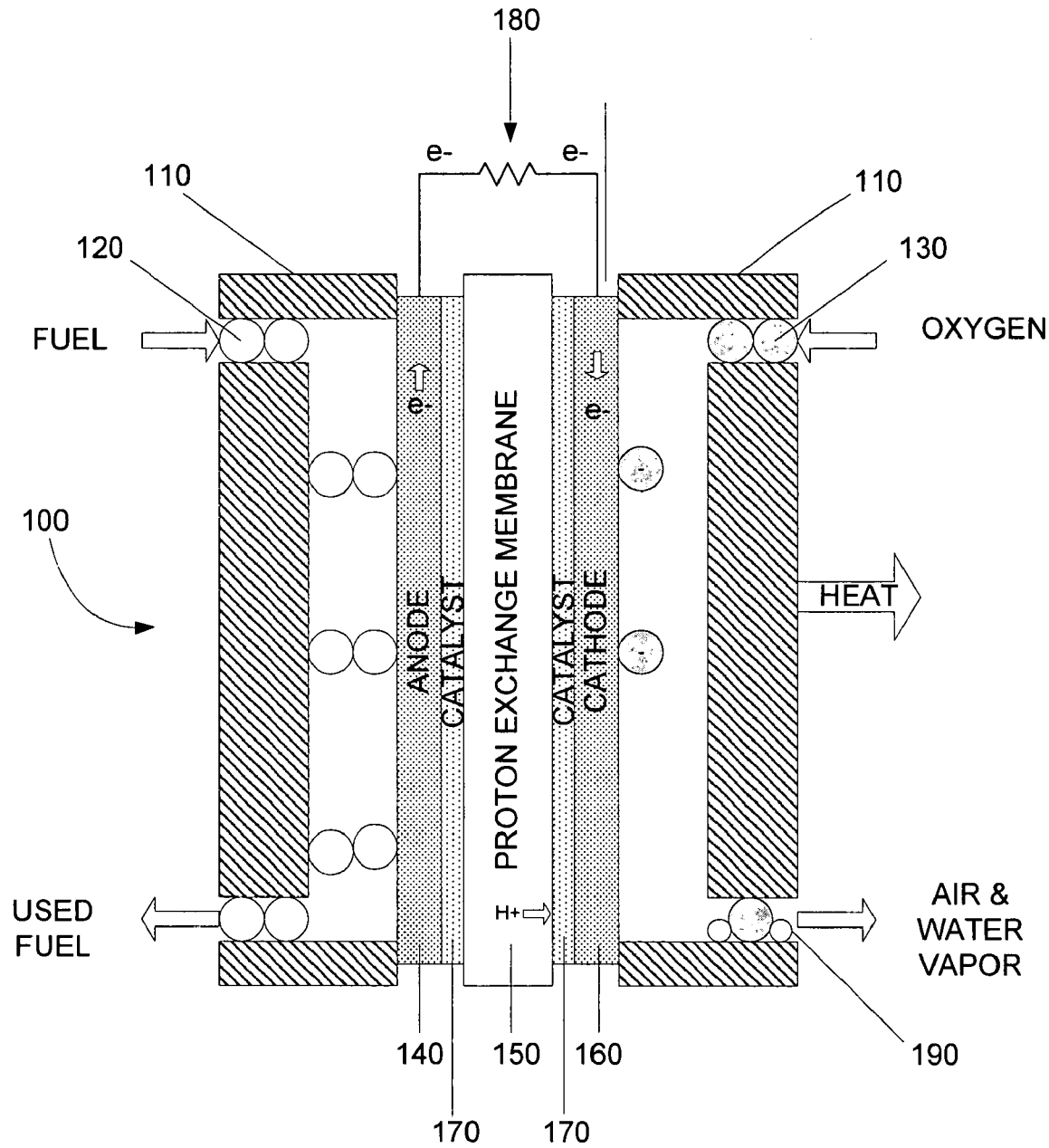
FIG. 1 illustrates a cross-sectional view of a proton exchange membrane fuel cell (PEMFC) according to one exemplary embodiment.

FIG. 1 illustrates a cross-sectional view of a proton exchange membrane fuel cell (PEMFC) (100) according to one exemplary embodiment. As illustrated in FIG. 1, a PEMFC (100) may include a housing (110) that surrounds a membrane/electrode assembly (MEA). As shown in FIG. 1, the MEA may include an anode (140) and a cathode (160) surrounding a proton exchange membrane (PEM) (150). A catalyst (170) is also disposed on the boundary between the anode (140) and the PEM (150) as well as between the cathode (160) and the PEM (150). As illustrated in FIG. 1, the anode (140) and the cathode (160) may also be electrically coupled to an electrical load (180).

The housing (110) of the PEMFC (100) illustrated in FIG. 1 may be configured to form a number of chambers. The chambers formed by the housing (110) may provide fuel (120) to the anode (140) and oxygen (130) to the cathode (160) as illustrated in FIG. 1. When in operation, the fuel (120), typically hydrogen, is presented at the anode (140) where it undergoes a catalytic decomposition into both protons and electrons. The electrons are transferred from the anode (140) to an external circuit or load (180) and back to the cathode (160) of the PEMFC (100). The electrons that have returned to the cathode then combine with the oxygen (130) provided at the cathode. The protons solvate with water molecules and pass through the proton exchange membrane (150) where they are also presented at the cathode (160). The protons then join the oxygen, forming water molecules (190).

The PEM (150) forms a crucial part of the above-mentioned process. The PEM (150) may be made of any material capable of transporting the above-mentioned protons, while providing resistance to gas crossover between the anode (140) and cathode (160) side including, but in no way limited to, a solid polymer electrolyte membrane such as perfluorosulfonate ionomer membrane. Commercial examples of perfluorosulfonate ionomer membrane include NAFION, FLEMION, and DOW XUS.

Traditional methods of forming the PEM (150) and joining the PEM (150) to the electrode layers (140, 160) incorporate a hot press method which causes the perfluorosulfonate ionomer to go from a fully hydrated state to a smaller dehydrated state. When the PEMFC (100) is in operation, the perfluorosulfonate ionomer may become hydrated again causing swelling and structural instability in the PEM (150). The swelling and/or structural instability caused by the hydration of the perfluorosulfonate ionomer may result in an increase of fuel crossover within the PEMFC (100). Fuel crossover is meant to be understood both here and in the appended claims as a parasitic loss of unreacted or partially reacted fuel across a fuel cell membrane, potentially leading to unwanted parasitic reactions. This loss of fuel effectively reduces the overall efficiency of the PEMFC (100). The unreacted or partially reacted fuel that may be lost due to fuel crossover may include, but is in no way limited to, methanol (in a DMFC), isopropanol, ethanol, or any other fuel that may be used in a fuel cell suffering from fuel crossover.

Figure 2:
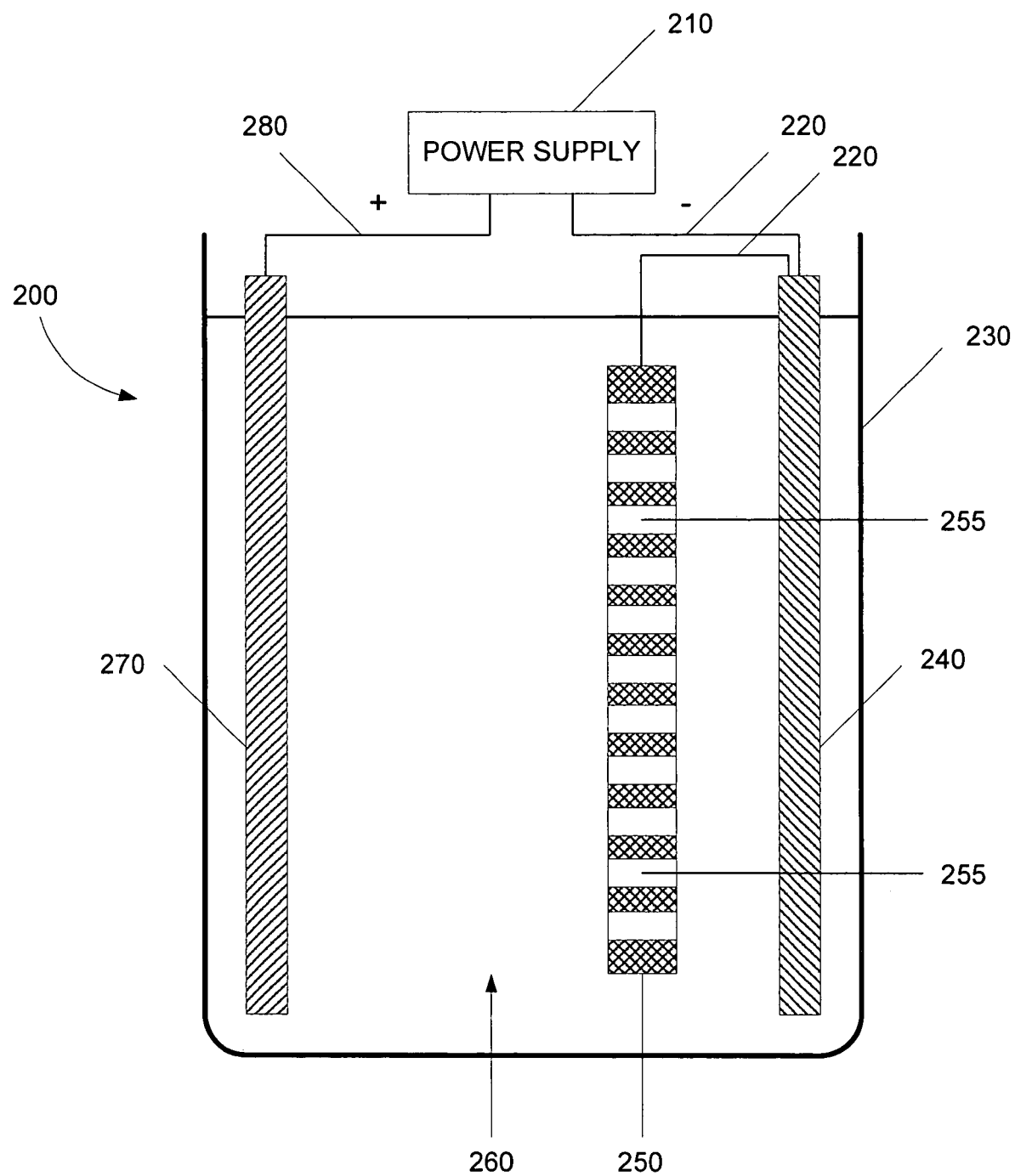
FIG. 2 is a cross-sectional view illustrating an electrodeposition system according to one exemplary embodiment.

FIG. 2 shows a cross-sectional view of an electrodeposition system configured to deposit polymeric electrolytes on a conductive porous substrate such that swelling and structural instability may be reduced. As shown in FIG. 2, the electrodeposition system (200) may include a power supply (210) having both a positive lead (280) and a negative lead (220). The positive lead (280) is electrically connected to a positively charged electrode (270). Similarly, the negative lead (220) is electrically connected to a negatively charged electrode (240) which is subsequently electrically coupled to an electrically conductive, porous substrate (250). The electrodeposition system illustrated in FIG. 2 also shows a positively charged electrode (270), a negatively charged electrode (240), and a porous substrate submersed in a container (230) filled with a polymeric electrolyte solution (260).

The power supply (210) illustrated in FIG. 2 is a direct current (DC) power supply capable of providing voltage to the electrodes (270, 240) sufficient to produce an electric field for the electrodeposition of a polymeric electrolyte. Moreover the positive (280) and negative (220) leads that are electrically coupling the electrodes (270, 240) to the power supply (210) may be any electrical conductor capable of transmitting a DC signal from a power supply to electrodes including, but in no way limited to, conductive signal wire or conductive straps.

The electrically conductive, porous substrate (250) shown in FIG. 2 may include a number of pores (255) configured to receive a polymeric electrolyte and facilitate the transmission of protons. The electrically conductive, porous substrate (250) illustrated in FIG. 2 may be made of any conductive substrate capable of both providing mechanical support to a PEM and being sufficiently porous as to not unduly limit the flow of the above-mentioned protons. The conductive substrate may include, but is in no way limited to, stainless steel wool, porous stainless steel, etc. Moreover, the present electrodeposition system and method is in no way limited to porous substrates. The present electrodeposition system and method may also be performed on a dense, non-porous substrate.

Figure 4A:
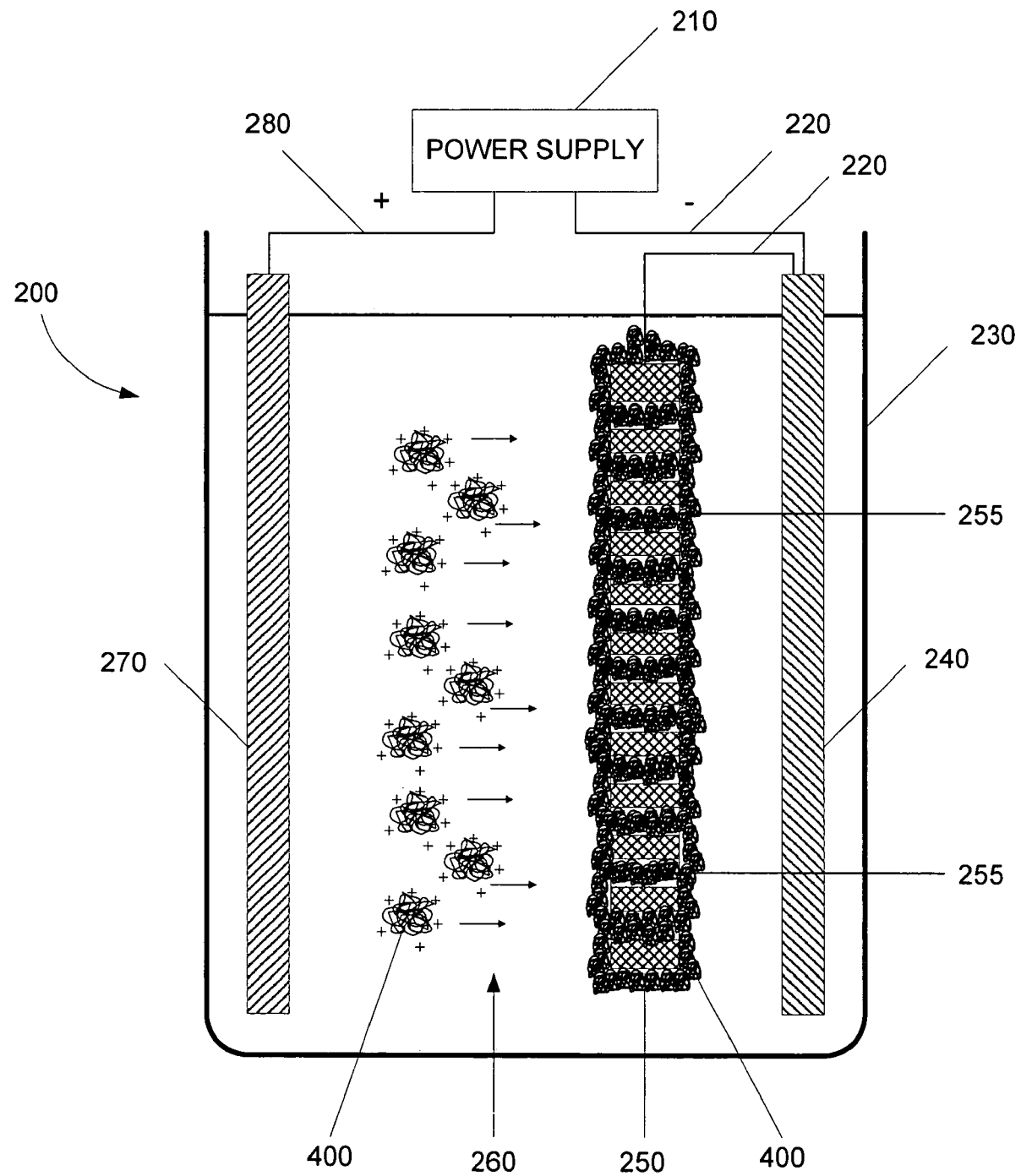
FIG. 4A is a cross-sectional view illustrating the electrophoretic deposition of a conductive porous substrate according to one exemplary embodiment.
Figure 4B:
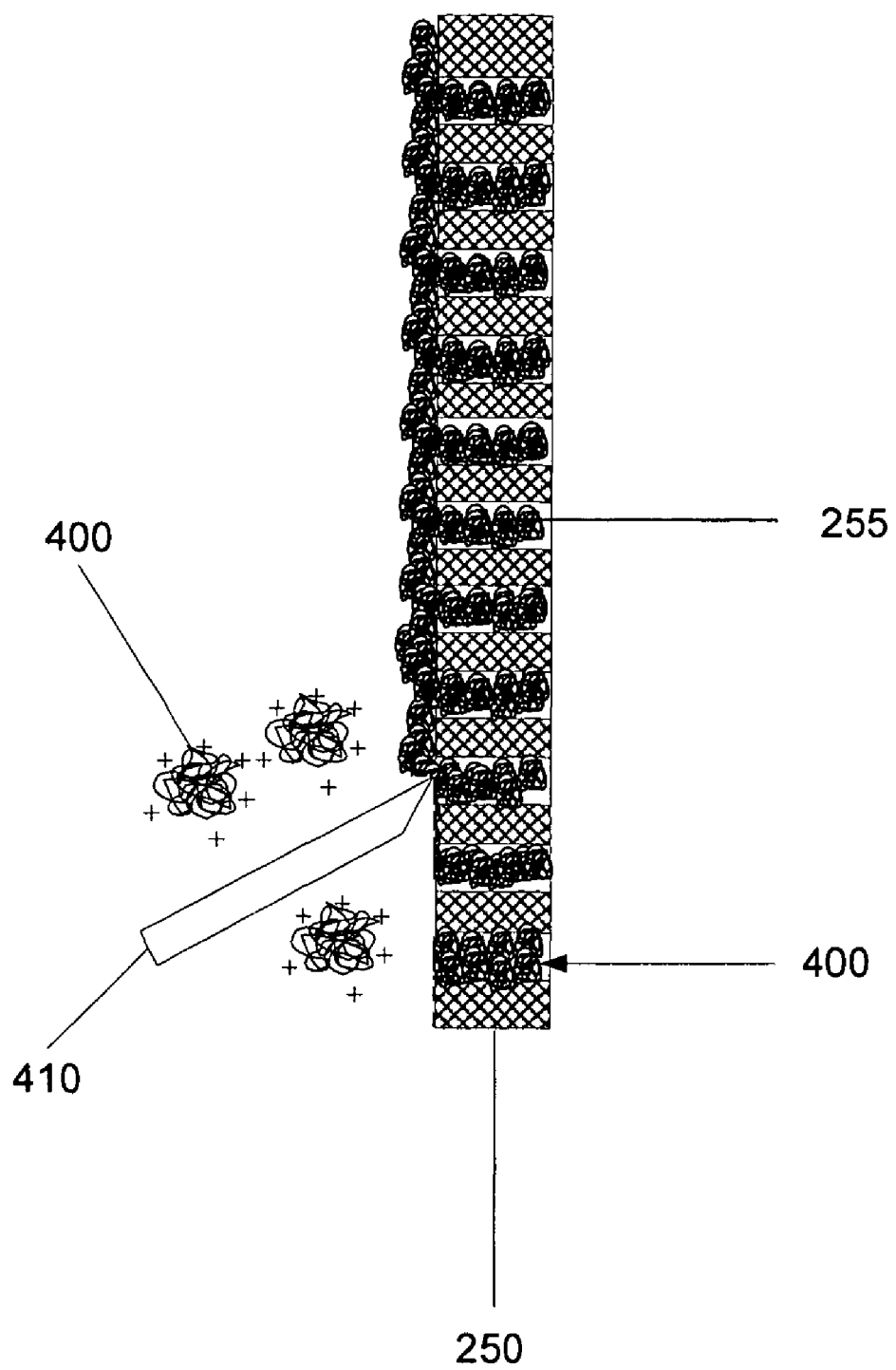
FIG. 4B is a cross-sectional view illustrating a post deposition treatment that may be performed on a conductive porous substrate according to one exemplary embodiment.
Figure 4C:
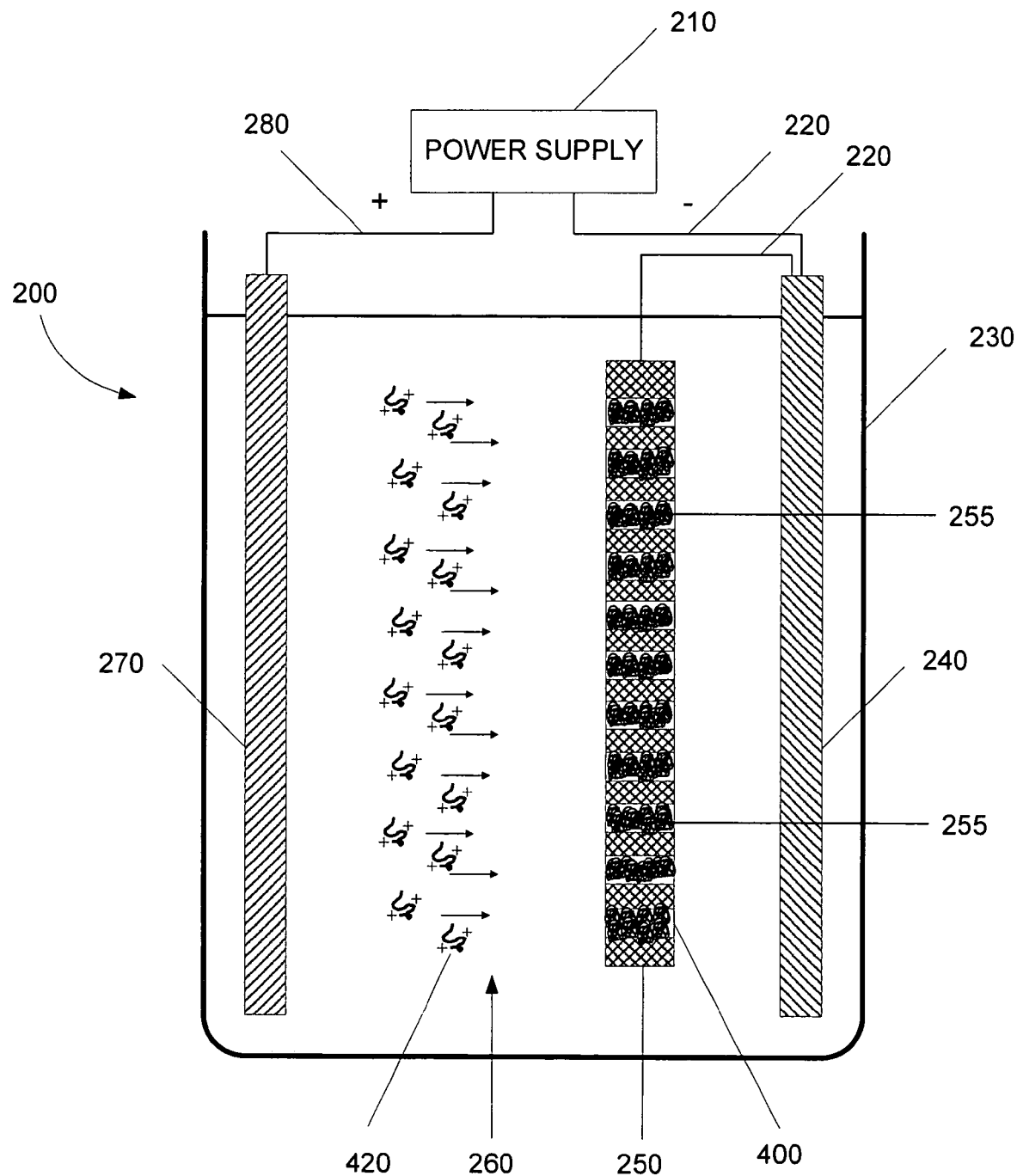
FIG. 4C is a cross-sectional view illustrating the electrolytic deposition of a conductive porous substrate according to one exemplary embodiment.

The polymeric electrolyte solution (260) illustrated in FIG. 2 may either contain charged particles (400; FIG. 4A) or charged ions (420; FIG. 4C) of the perfluorosulfonate ionomer, depending on the stage of the electrodeposition process.

Exemplary Implementation and Operation

Figure 3:
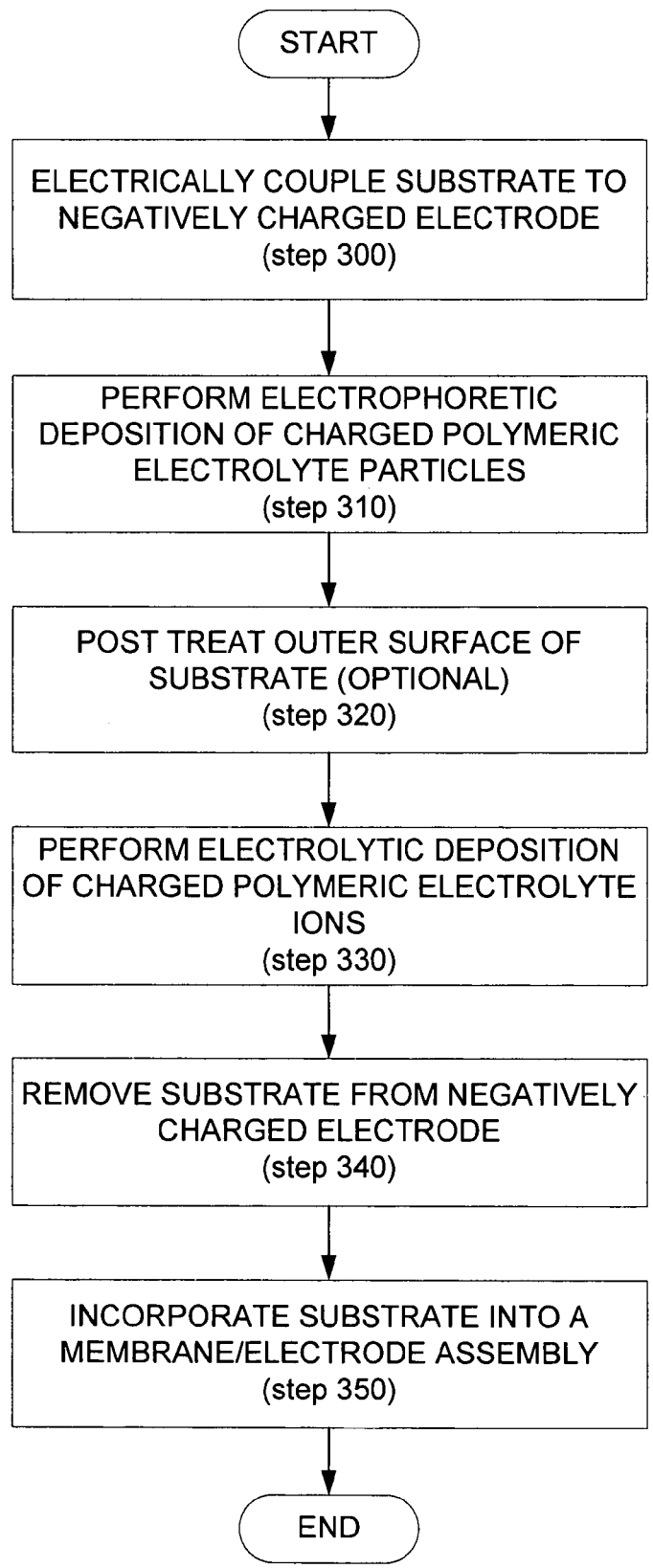
FIG. 3 is flow chart illustrating a method of coating a conductive porous substrate with polymeric electrolyte according to one exemplary embodiment.

FIG. 3 is a block diagram illustrating an exemplary embodiment of the present method for performing electrodeposition of a polymeric electrolyte on a conductive, porous substrate using the apparatus illustrated in FIG. 2. As shown in FIG. 3, the electrodeposition process may begin by electrically coupling the porous, electrically conductive substrate to a negatively charged electrode (step 300). Once the negatively charged electrode and the substrate are electrically coupled, an electrophoretic deposition of charged polymeric electrolyte particles may be performed on the porous, electrically conductive substrate (step 310). After the electrophoretic deposition process, the outer surface of the substrate may optionally be post treated (a.k.a. post deposition treated) (step 320) and an electrolytic deposition process may be performed on the substrate (330). When the electrolytic deposition process is complete, the substrate may be removed from the negatively charged electrode (step 340) and implemented into a membrane/electrode assembly (MEA) (step 350). The exemplary method illustrated in FIG. 3 will now be described in further detail with reference to FIGS. 4A, 4B, and 4C.

As stated earlier, the electrodeposition of the polymeric electrolyte on a conductive porous substrate begins by electrically coupling the conductive porous substrate to a negatively charged electrode (step 300). As shown in FIG. 4A, the above-mentioned electrical coupling may be performed by coupling an electrical lead (220) from the negatively charged electrode (240) to the conductive porous substrate (250). As shown in FIG. 4A, the electrical lead may be configured to create a gap between the negatively charged electrode (240) and the conductive porous substrate (250). This gap may facilitate the electrophoretic deposition process (step 310; FIG. 3).

Once the conductive porous substrate and the negatively charged electrode are electrically coupled (step 300; FIG. 3), the electrophoretic deposition of charged polymeric electrolyte particles may be performed (step 310; FIG. 3). FIG. 4A illustrates the process of electrophoretic deposition of charged polymeric electrolyte particles (400) on a conductive porous substrate (250). As shown in FIG. 4A, the positively charged electrode (270), the negatively charged electrode (240), and the conductive porous substrate (250) are all disposed in a polymeric electrolyte solution (260) containing positively charged polymeric electrolyte particles (400).

When DC power is supplied from the power supply (210) to the electrodes (240, 270) and subsequently to the conductive porous substrate (250), the positively charged polymeric electrolyte particles (400) present in the electrolyte (260) are electrostatically accelerated away from the positively charged electrode (270) and toward the conductive porous substrate (250). The positively charged polymeric electrolyte particles (400) may fill the pores (255) and surround the outer surface of the conductive porous substrate (250) as shown in FIG. 4A. The gap created between the negatively charged electrode (240) and the conductive porous substrate allows the positively charged polymeric electrolyte particles (400) to surround the entire outer surface of the conductive porous substrate (250). The filling of the pores (255) and the surrounding of the outer surface of the conductive porous substrate (250) may occur by charge transfer between the positively charged polymeric electrolyte particles (400) and the conductive porous substrate (250) due to the electrical charge therein.

Once the electrophoretic deposition of the positively charged polymeric electrolyte particles has occurred on the conductive porous substrate (step 310; FIG. 3), the conductive porous substrate (250) may optionally be post treated to remove the polymeric electrolyte particles (400) that formed on the outer surface of the conductive porous substrate (step 320; FIG. 3). The removal of the outer polymeric electrolyte particles (400) may be desired in order to improve the surface finish of the electrolyte thereby improving adhesion to an anode (140; FIG. 1) and/or a cathode (160; FIG. 1). As shown in FIG. 4B, the layer of polymeric electrolyte particles (400) may be removed from the conductive porous substrate (250) by a mechanical device (410) such as a mill. Alternatively, the polymeric electrolyte particles (400) may be removed from the outer surface of the conductive porous substrate (250) by any appropriate chemical or abrasive process. The removal of the polymeric electrolyte particles may occur while the conductive porous substrate (250) is electrically coupled to the negatively charged electrode (240; FIG. 4A), or the conductive porous substrate (250) may be electrically un-coupled from the negatively charged electrode (240; FIG. 4A) prior to removal of the polymeric electrolyte particles (400) as shown in FIG. 4B.

When the outer surface of the conductive porous substrate (250) has been sufficiently post treated, an electrolytic deposition of charged polymeric electrolyte ions may be performed (step 330; FIG. 3). As shown in FIG. 4C, the electrolytic deposition of charged polymeric electrolyte ions is performed by again coupling the conductive porous substrate (250) to the negatively charged electrode (240) and immersing them and a positively charged electrode (270) in a container (230) filled with a polymeric electrolyte solution (260) containing charged ions of perfluorosulfonate ionomer (420).

When the DC power is supplied from the power supply (210) to the electrodes (240, 270) and subsequently to the conductive porous substrate (250), the positively charged polymeric electrolyte ions (420) that are present in the electrolyte (260) are electrostatically accelerated away from the positively charged electrode (270) and toward the conductive porous substrate (250). The positively charged polymeric electrolyte ions (420) coat and completely insulate the outer surface of the conductive porous substrate (250) as shown in FIG. 4C. The positively charged polymeric electrolyte ions (420) may adhere to the conductive porous substrate by charge transfer between the positively charged polymeric electrolyte ions (420) and the conductive porous substrate (250) due to the electrical charge therein.

The insulation of the outer surface of the conductive porous substrate (250) after the optional machining process (step 320; FIG. 3) is performed in order to prevent "short circuiting" an MEA of a fuel cell incorporating the electrolyte. When coupled to a cathode (160; FIG. 1) and an anode (140; FIG. 1), any surface of the conductive porous substrate (250) that is not completely insulated will act as an electrical conduit between the anode (140; FIG. 1) and the cathode (160; FIG. 1), preventing the release of electrons into the outer circuit (180; FIG. 1). This short circuit is prevented by the electrolytic deposition of the outer surface of the conductive porous substrate (according to step 330).

Once the electrolytic deposition has been performed on the outer surface of the conductive porous substrate (250), the formation of the electrolyte is complete. As a result, the electrolyte may be removed from the polymeric electrolyte solution (260) and decoupled from the negatively charged electrode (step 340). Once removed, the electrolyte may be coupled to an anode (140; FIG. 1), a cathode (160; FIG. 1), and a catalyst (170; FIG. 1) to form a membrane/electrode assembly (MEA) (step 350) that may then be incorporated in a fuel cell as shown in FIG. 1.

A MEA formed according to the above-mentioned method will have a number of advantages when incorporated in a fuel cell. First, the incorporation of the conductive porous substrate (250; FIG. 4A) in the electrolyte will provide structural integrity to the MEA. Moreover, since the polymer electrolyte material is substantially confined to the porous spaces of the conductive porous substrate, the degree of swelling that may occur during the power production process is limited both by the quantity of polymer electrolyte material used and by the resistance to swelling provided by the conductive porous substrate. Moreover, because the above-mentioned process forms the polymer electrolyte material while in an aqueous solution and with little application of heat, the likelihood of dehydration of the polymer electrolyte is reduced. This reduction in the likelihood of dehydration of the polymer electrolyte may reduce the detrimental impact of the re-hydration process of the MEA during operation, specifically in regards to electrolyte layer adhesion, overall mechanical integrity, and susceptibility to fuel crossover.

Alternative Embodiments

Figure 5:
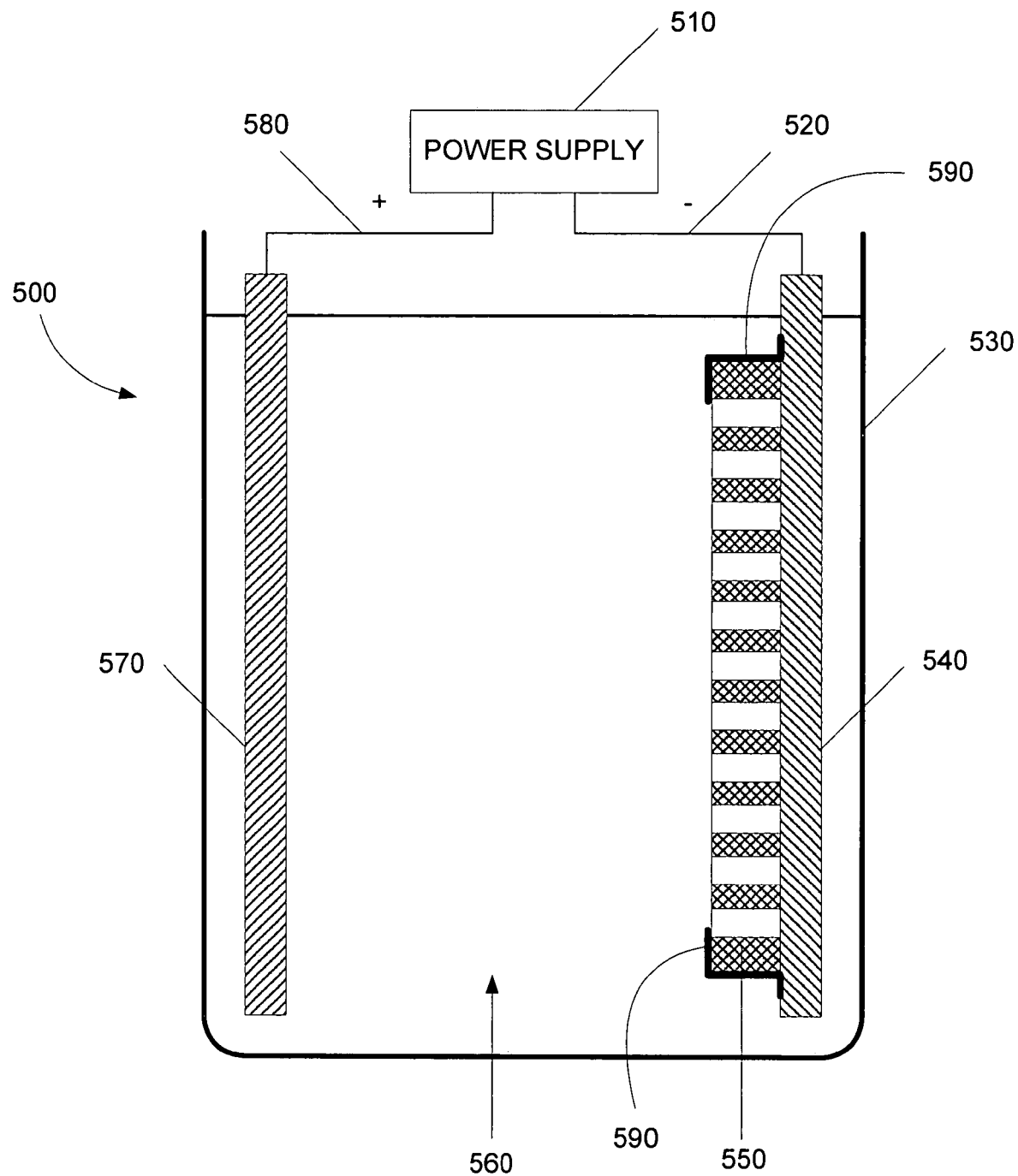
FIG. 5 is a cross sectional view illustrating an electrodeposition system according to one exemplary embodiment.

According to one alternative embodiment, illustrated in FIG. 5, an electrodeposition system may be configured to deposit a polymeric electrolyte on a non-conductive porous substrate (550). As shown in FIG. 5, an electrodeposition system configured to deposit polymeric electrolytes on a non-conductive porous substrate (550) may include a power supply (510), capable of providing DC power, electrically coupled to a positively charged electrode (570) and a negatively charged electrode (540). The electrodes (540, 570) may be electrically coupled to the power supply (510) through a positive (580) and a negative (520) electrical leads. The electrical leads (520, 580) may be any electrical conductor that may transfer an electrical charge from the power supply (510)

to the electrodes (540, 570) including, but in no way limited to, signal wire or conductive straps.

The negatively charged electrode may include a plurality of substrate securing brackets (590) to couple a non-conductive porous substrate (550) to the negatively charged electrode (540). The securing brackets illustrated in FIG. 5 may be any device configured to secure a non-conductive substrate to a negatively charged electrode (540) including, but in no way limited to, an adhesive or a mechanical device such as a screw, a nail, or a tab. The alternative embodiment illustrated in FIG. 5 also shows the positive (570) and negative (540) substrates along with their coupled components (550, 590) disposed in a container (530) containing a polymeric electrolyte solution (560).

Figure 6:
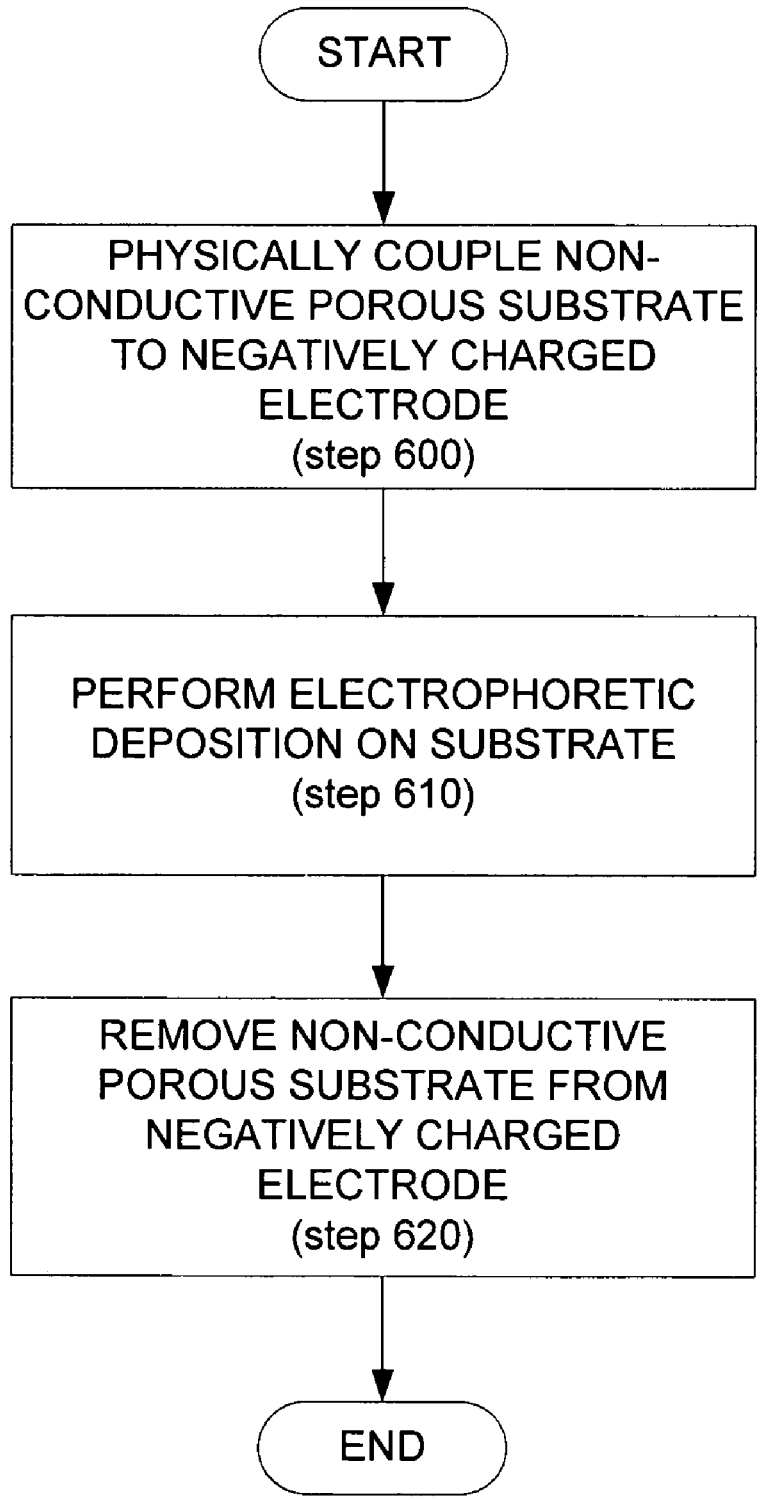
FIG. 6 is a flow chart illustrating a method of coating a non-conductive porous substrate with polymeric electrolyte according to one exemplary embodiment.

A method for using the electrodeposition system of FIG. 5 is illustrated in FIG. 6. As shown in FIG. 6, the electrodeposition of a polymeric electrolytes on a non-conductive porous substrate includes physically coupling a non-conductive porous substrate to a negatively charged electrode (step 600), performing an electrophoretic deposition process on the non-conductive porous substrate (step 610), and removing the non-conductive porous substrate from the negatively charged electrode so that it may be incorporated into a fuel cell (step 620). The method of FIG. 6 will now be described in detail with reference to FIGS. 7A and 7B.

As mentioned above, the electrodeposition of polymeric electrolytes on a non-conductive porous substrate begins with physically coupling a non-conductive porous substrate to a negatively charged electrode (step 600). The coupling of the non-conductive porous substrate (550; FIG. 5) to the negatively charged electrode (540; FIG. 5) may be performed by any mechanical or chemical means capable of temporarily securing the non-conductive porous substrate to the negatively charged electrode including, but in no way limited to, adhesives, mechanical fasteners such as tabs or screws, or any appropriate combination thereof.

Figure 7A:
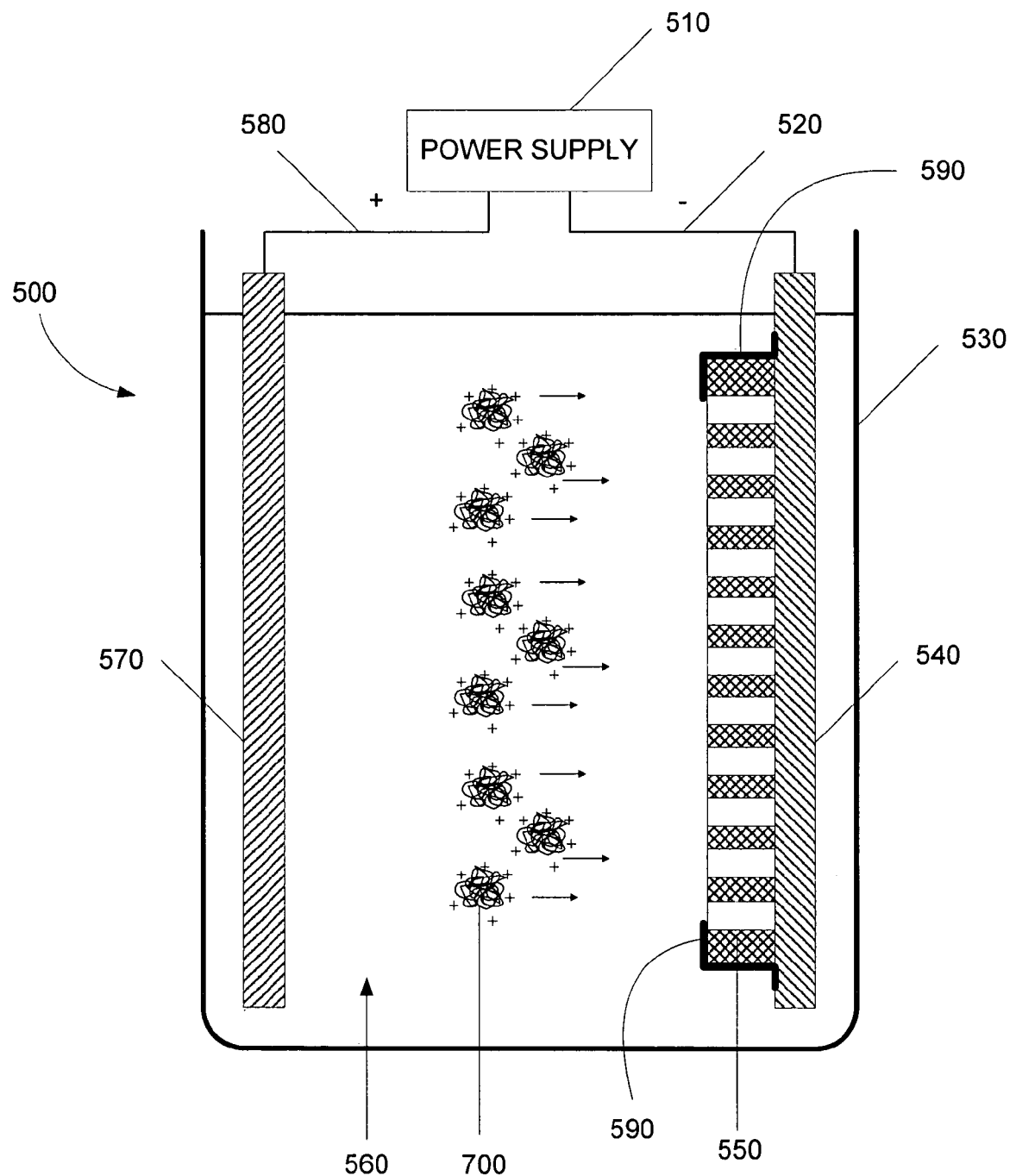
FIG. 7A is a cross-sectional view illustrating the electrophoretic deposition of a non-conductive porous substrate according to one exemplary embodiment.

Once the non-conductive porous substrate is physically coupled to the negatively charged electrode, an electrophoretic deposition process may be performed on the substrate (step 610). As shown in FIG. 7A, the positively charged electrode (570) and the negatively charged electrode (540), along with all the coupled components (550, 590) are submerged in a polymeric electrolyte solution (560) containing a number of positively charged polymeric electrolyte particles (700). According to one exemplary embodiment, the positively charged polymeric electrolyte particles (700) may be perfluorosulfonate ionomer.

Figure 7B:
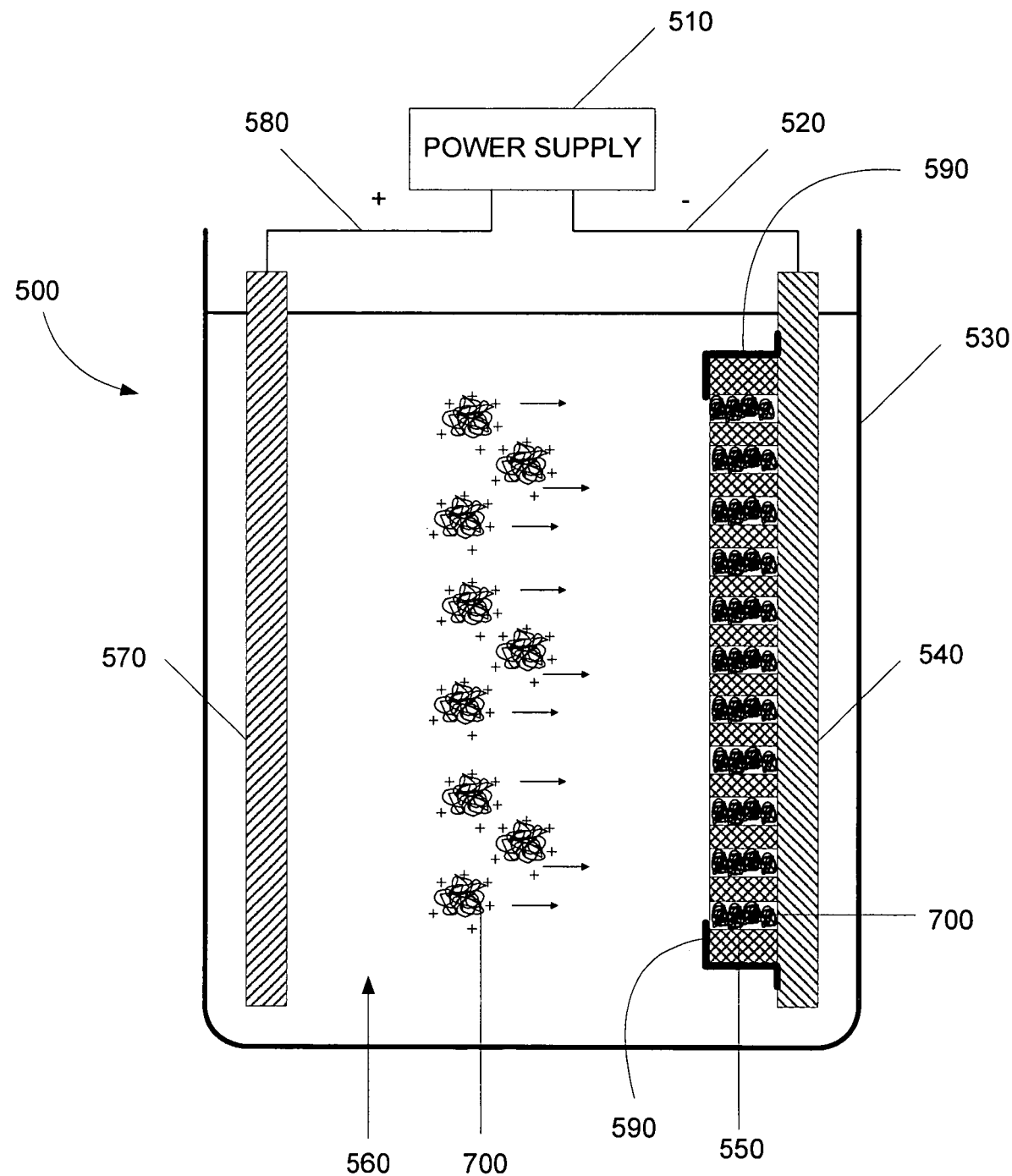
FIG. 7B is a cross-sectional view further illustrating the electrophoretic deposition of a non-conductive porous substrate according to one exemplary embodiment.

FIG. 7B further illustrates how the electrophoretic deposition occurs on the non-conductive porous substrate (step 610). As shown in FIG. 7B, when the power supply (510) provides an electrical current to the positive and negative electrodes (570, 540), an electric field is developed in the polymeric electrolyte solution (560) causing the charged polymeric electrolyte particles (700) to be repelled by the positively charged electrode and attracted toward the negatively charged electrode (540). As the electric field is activated, the charged polymeric electrolyte particles (700) are accelerated toward the negatively charged electrode (540), and consequently, toward the non-conductive porous substrate (550). When the polymeric electrolyte particles (700) come into contact with the non-conductive porous substrate (550), the polymeric electrolyte particles (700) precipitate in the pores of the substrate. However, since the non-conductive porous substrate (550) is not made of a conductive material, the negative charge of the negatively charged electrode (540) will not be transferred through the non-conductive porous substrate. Consequently, the top surface of the non-conductive porous substrate (550) will not be coated by the polymeric electrolyte particles (700) and no need exists for the substrate to be mechanically processed. Additionally, unlike the process illustrated in FIG. 3, there is no need to completely insulate the non-conductive porous substrate (550) with an electrolytic deposition of polymeric electrolyte ions because the non-conductive porous substrate will not short circuit the MEA of a fuel cell.

With the pores of the non-conductive porous substrate filled with polymeric electrolytes, the formation of the electrolyte is complete. As a result, the non-conductive porous substrate may be removed from the negatively charged electrode (step 620; FIG. 6) and coupled to an anode (140; FIG. 1), a cathode (160; FIG. 1), and a catalyst (170; FIG. 1) to form a membrane/electrode assembly (MEA) that may then be incorporated in a fuel cell as shown in FIG. 1.

Similar to the MEA formed through electrodeposition of polymeric electrolytes using a conductive porous substrate, the use of a non-conductive porous substrate as described above presents a number of advantages. The advantages include an increased structural integrity to the MEA, a reduction in the degree of swelling that may occur during the power production process of a fuel cell, a reduction in the likelihood of dehydration of the polymer electrolyte, and an increased resistance to swelling and methanol crossover.

Although exemplary embodiments have been described above, numerous modifications and/or additions to the above-described embodiments would be readily apparent to one skilled in the art. By way of example, but not limitation, the various components of the exemplary electrodeposition systems described above may be interchanged. It is intended that the scope of the present method extend to all such modifications and/or additions.

In conclusion, the present system for the electrodeposition of polymeric electrolytes on porous substrates, in its various embodiments, simultaneously reduces the likelihood of swelling, increases mechanical stability, and reduces the possibility of methanol crossover. Specifically, the present electrodeposition method provides a method for the electrodeposition of polymeric electrolytes on either a conductive or non-conductive porous substrate. The electrodeposition may occur in an aqueous solution and with a reduction in heat as compared to traditional approaches. As a result, electrolyte swelling is reduced and the likelihood of methanol crossover is reduced.

The preceding description has been presented only to illustrate and describe exemplary embodiments. It is not intended to be exhaustive or to limit the exemplary embodiments to any precise form disclosed. Many modifications and variations are possible in light of the above teaching. It is intended that the scope be defined by the following claims.

What is claimed is:

1. A method of manufacturing an electrolyte comprising:
   coupling a porous substrate to a charged electrode;
   electrodepositing a polymeric electrolyte on said porous substrate including in pores of said porous substrate; and
   coupling said electrolyte and porous substrate to an anode, a cathode and a catalyst.

2. The method of claim 1, wherein said substrate comprises a conductive porous substrate; and said polymeric electrolyte coats and completely insulates an outer surface of said conductive porous substrate.

3. The method of claim 2, wherein said conductive porous substrate comprises a porous stainless steel substrate.

4. The method of claim 2, wherein said electrodepositing a polymeric electrolyte further comprises:

disposing said porous substrate and said charged electrode in a polymeric electrolyte solution containing charged polymeric electrolyte particles; and generating an electric field in said polymeric electrolyte solution;

wherein said generated electric field accelerates charged polymeric electrolyte particles to said porous substrate.

5. The method of claim 4, wherein said charged polymeric electrolyte particles further comprise perfluorosulfonate ionomer particles.

6. The method of claim 5, wherein said perfluorosulfonate ionomer particles are deposited on said porous substrate by electrophoretic deposition.

7. The method of claim 1, wherein said porous substrate comprises steel wool.

8. The method of claim 1, further comprising removing deposited polymeric electrolyte from an outer surface of said porous substrate, while leaving said polymeric electrolyte in pores of said porous substrate.

9. The method of claim 8, wherein said removal of deposited polymeric electrolyte comprises machining said deposited electrolyte with a blade.

10. The method of claim 1, wherein said electrodepositing a polymeric electrolyte further comprises:

disposing said substrate and said charged electrode in a polymeric electrolyte solution containing charged polymeric electrolyte ions; and generating an electric field in said polymeric electrolyte solution;

wherein said electric field accelerates charged polymeric electrolyte ions to said substrate.

11. The method of claim 10, wherein said charged polymeric electrolyte ions further comprise perfluorosulfonate ionomer ions.

12. The method of claim 11, wherein said perfluorosulfonate ionomer ions are deposited on said porous substrate by electrolytic deposition.

13. The method of claim 12, wherein said perfluorosulfonate ionomer ions are deposited on an outer surface of said porous substrate.

14. The method of claim 1, wherein said substrate comprises a non-conductive porous substrate.

15. The method of claim 14, wherein said electrodepositing a polymeric electrolyte further comprises:

disposing said porous substrate and said charged electrode in a polymeric electrolyte solution containing charged polymeric electrolyte particles; and generating an electric field in said polymeric electrolyte solution;

wherein said electric field accelerates charged polymeric electrolyte particles to said porous substrate.

16. The method of claim 15, wherein said charged polymeric electrolyte particles further comprise perfluorosulfonate ionomer particles.

17. The method of claim 16, wherein said perfluorosulfonate ionomer particles are deposited on said porous substrate by electrophoretic deposition.

18. The method of claim 1, in which said electrodepositing a polymeric electrolyte further comprises:

depositing charged polymeric electrolyte particles on a substrate by electrophoretic deposition;

subsequently, depositing additional charged polymeric electrolyte particles on said substrate by electrolytic deposition; and treating a surface of said substrate by removing polymeric electrolyte particles between said depositing of charged polymeric electrolyte particles and said depositing of additional charged polymeric electrolyte particles.

* * * * *